United States Patent
Cartes et al.

(10) Patent No.: US 10,234,917 B2
(45) Date of Patent: Mar. 19, 2019

(54) SEQUENTIAL RESETS OF REDUNDANT SUBSYSTEMS WITH RANDOM DELAYS

(71) Applicant: Hewlett Packard Enterprise Development LP, Houston, TX (US)

(72) Inventors: Andrew C Cartes, Cypress, TX (US); Stewart Gavin Goodson, Cypress, TX (US); Rameez Kadar Kazi, Houston, TX (US); Adam Ruiz, Houston, TX (US); Doug Hascall, Cypress, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 237 days.

(21) Appl. No.: 15/173,396

(22) Filed: Jun. 3, 2016

(65) Prior Publication Data
US 2017/0351578 A1   Dec. 7, 2017

(51) Int. Cl.
| G06F 11/14 | (2006.01) |
| G06F 1/20 | (2006.01) |
| G06F 11/00 | (2006.01) |
| G06F 11/20 | (2006.01) |

(52) U.S. Cl.
CPC ............ *G06F 1/206* (2013.01); *G06F 11/004* (2013.01); *G06F 11/1435* (2013.01); *G06F 11/2017* (2013.01)

(58) Field of Classification Search
CPC . G06F 11/1441; G06F 11/1443; G06F 11/004
See application file for complete search history.

(56) References Cited

U.S. PATENT DOCUMENTS

| 7,613,937 | B2 | 11/2009 | Boyum et al. | |
| 7,685,281 | B1* | 3/2010 | Saraiya | G06F 13/387 370/392 |
| 7,870,379 | B2 | 1/2011 | Krieger et al. | |
| 8,677,165 | B2 | 3/2014 | Atkinson | |
| 8,725,998 | B1* | 5/2014 | Gabrielson | G06F 9/24 713/1 |
| 8,782,633 | B1* | 7/2014 | Tamilarasan | G06F 8/665 717/173 |
| 2007/0234332 | A1* | 10/2007 | Brundridge | G06F 8/65 717/168 |
| 2008/0189500 | A1* | 8/2008 | Jennings | G06F 9/3824 711/164 |

(Continued)

FOREIGN PATENT DOCUMENTS

CN    104391558    3/2015

OTHER PUBLICATIONS

Dataprobe, Ibootber Multi-outlet Remote Power Control, 2016, 6 pages, retrieved from http://dataprobe.com/ibootbar.html.

*Primary Examiner* — Yolanda L Wilson
(74) *Attorney, Agent, or Firm* — Hewlett Packard Enterprise Patent Department

(57) ABSTRACT

Example implementations relate to sequential resets of redundant subsystems. For example, in an implementation, a controller may receive a maintenance activity instruction and may perform the maintenance activity on the redundant subsystems. After performance of the redundant subsystems, the controller may sequentially reset each of the redundant subsystems. The controller may wait a random delay between sequential resets of the redundant subsystems.

19 Claims, 5 Drawing Sheets

(56) References Cited

U.S. PATENT DOCUMENTS

| | | | | |
|---|---|---|---|---|
| 2011/0106886 A1* | 5/2011 | Nolterieke | | G06F 8/65 709/204 |
| 2013/0138997 A1* | 5/2013 | Wang | | H04L 41/0856 714/4.11 |
| 2013/0151841 A1* | 6/2013 | McGraw | | G06F 11/3006 713/100 |
| 2015/0363190 A1* | 12/2015 | Bhatia | | G06F 3/0482 717/172 |

* cited by examiner

SEQUENTIAL RESETS OF REDUNDANT SUBSYSTEMS WITH RANDOM DELAYS

BACKGROUND

An electronic system, such as a computing or storage system, may employ redundant subsystems. Redundancy may duplicate the functionality of a subsystem for increased reliability of the system. Redundancy may be useful particularly where the subsystem functionality is important for operation of the system.

BRIEF DESCRIPTION OF THE DRAWINGS

Various examples will be described below with reference to the following figures.

Figure 1:
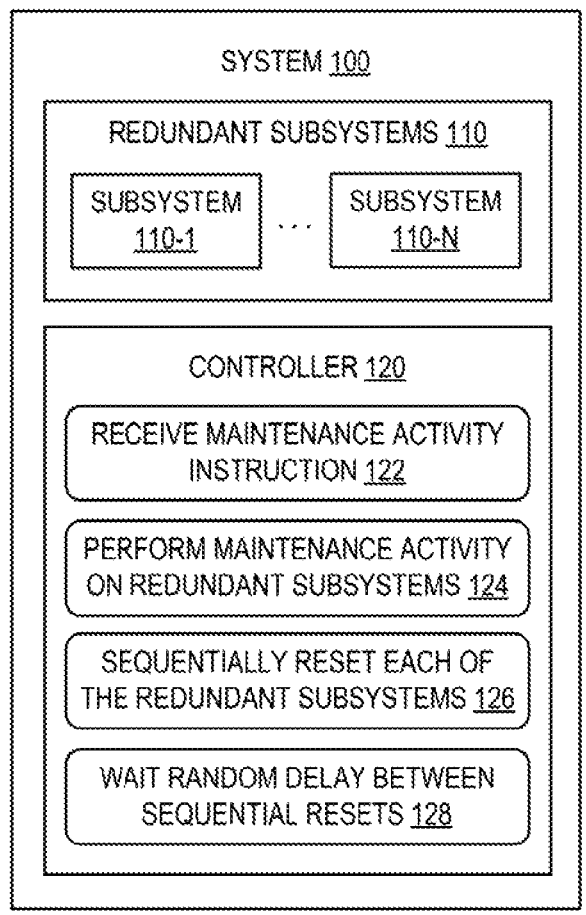
FIG. 1 is a block diagram that depicts an example system that waits random delays between sequential resets of redundant subsystems.

Throughout the drawings, identical reference numbers may designate similar, but not necessarily identical, elements. A hyphenated index number "N" appended to some of the reference numerals may be understood to merely denote plurality and may not necessarily represent the same quantity for each reference numeral having such an index number "N". Additionally, use herein of a reference numeral without a hyphenated index number, where such reference numeral is referred to elsewhere with a hyphenated index number, may be a general reference to the corresponding plural elements, collectively or individually.

DETAILED DESCRIPTION

Redundancy may relate to the duplication of functions or components of a system for the purposes of increasing reliability of those functions or components, and thus more generally, the reliability of the system. In some cases, redundancy may take the form of backup(s) or fail-safe(s). Some redundant components may undergo maintenance activities from time to time, to improve or restore their performance for example.

As but one example, an electronic system, such as a computing system or data storage system, generally includes a power supply that converts mains AC originating from a power plant and carried on feed(s) to DC power utilized by the internal components of the electronic system. However, the electronic system may shut off abruptly or be damaged if DC power is interrupted due to a malfunction, service interruption, or other fault anywhere along the power supply infrastructure (e.g., power supplies, feeds, grids, power plants). Thus, it may be useful to employ redundancies for at least some portions of the power supply infrastructure.

In some cases, the power supplies may undergo maintenance activities, such as firmware updates or maintenance resets or reboots. Maintenance activities may be or may include full resets to the power supplies, in order for the maintenance to take effect. However, where multiple systems with redundant power supplies are also undergoing maintenance activities at substantially the same time (e.g., as part of a datacenter-wide maintenance), power supply resets across the multiple systems may become time synchronous, resulting in power transients that also are synchronized and possibly causing load spikes on a power feed, load shift surges between redundant feeds, circuit breaker trips, and other faults. Accordingly, it may be useful to reduce the synchronization in maintenance activities in redundant systems, whether for power supply subsystems or other types of redundant subsystems.

Examples disclosed herein may relate to, among other things, a controller that can receive a maintenance activity instruction for the redundant subsystems, perform a maintenance activity on the redundant subsystems according to the maintenance activity instruction, sequentially reset each of the redundant subsystems after performance of the maintenance activity, and wait a random delay between sequential resets of the redundant subsystems. By virtue of waiting a random delay, among other features, redundant subsystem resets may be staggered and reset synchronization may be reduced, which may reduce the likelihood of load shifting problems or load spikes on infrastructure supporting the redundant subsystems.

Referring now to the figures, FIG. 1 is a block diagram that depicts an example system 100 that waits random delays between sequential resets of redundant subsystems. The system 100 may be a computing system, such as a server, a workstation, a desktop computer, etc.; a storage system; or other type of system that employs redundancies.

The system 100 includes redundant subsystems 110, which may comprise subsystems 110-1 through 110-N for example. The redundant subsystems 110 may also be referred to as subsystem(s) 110 for convenience. For example, to provide redundancy protection, subsystems 110 may include at least two subsystems 110: a subsystem 110-1 and a subsystem 110-2 (i.e., N=2).

In some implementations, the redundant subsystems 110 may include redundant power supplies. In the event one power supply malfunctions, another power supply may continue to provide power to the system 100. In other implementations, the redundant subsystems may include redundant networking subsystems to provide continuous network connectivity. In yet other implementations, the redundant subsystems 110 may include redundant thermal management subsystems, such as fans, liquid cooling systems, etc., so as to reduce the risk of overheating in the event a thermal management subsystem malfunctions. Other types of redundant subsystems also may be compatible with the techniques disclosed herein.

The system 100 also includes a controller 120. The controller 120 may be one or many of a processing resource, such as a microcontroller, a microprocessor, central processing unit (CPU) core, an application-specific integrated circuit (ASIC), a field programmable gate array (FPGA), and/or the like. The controller 120 may retrieve and/or execute instructions that implement functionality described herein, and the instructions may be stored on a non-transitory machine readable medium, such as such as random access memory (RAM), electrically erasable programmable read-only memory (EEPROM), flash memory, hard disk drives, optical discs, and the like. Additionally or alternatively, the controller 120 may be implemented as a hardware device comprising electronic circuitry or logic that performs functionality described herein.

The controller 120 may be coupled to the redundant subsystems 110 or otherwise capable of controlling aspects of the redundant subsystems 110. For example, the controller 120 may communicate with the redundant subsystems 110 via an I2C (inter-integrated circuit) bus or other types of communication bus.

In some implementations, the controller 120 may be included in or form at least part of a baseboard management controller, which may also be referred to as a lights out management controller, remote management controller, or the like. A baseboard management controller may communicate with another computing device, such as a client device or terminal, via an out-of-band communication path. For example, the client device may communicate with a baseboard management controller 120 via an out-of-band communication path, such that a user of the client device can remotely manage aspects of the system 100, such as firmware or hardware settings, remote rebooting, remote installation, system diagnostics, and logging. By virtue of out-of-band communications, the user at the client device may manage the system 100 during normal operation of the system 100, in the event of a failure of the system 100, or even when the system 100 has been powered off.

The controller 120, by execution of machine readable instructions or by operation of electronic circuitry or logic, may receive a maintenance activity instruction (122). In some implementations, the maintenance activity instruction may be received by the controller 120 via a wired or wireless network connection of the system 100 (e.g., the out-of-band communication path), via a physical medium (e.g., an optical medium such as a CD or DVD, a magnetic medium such as a removable disk, a USB drive, etc.), or other modes of data sharing.

In some implementations, the maintenance activity instruction may identify the redundant subsystems on which a maintenance activity is to be performed, particularly in cases where the system 100 may include multiple types of redundant subsystems. The maintenance activity instruction may also contain commands to be executed by the controller 120 in order to perform the maintenance activity on the redundant subsystems 110. For example, maintenance activity instruction may include a firmware package and commands to update the firmware of the redundant subsystems 110 using the firmware package; commands to change operational settings, firmware settings, or other settings of the redundant subsystems 110; commands to perform maintenance reboots or resets of the redundant subsystems 110; or other types of maintenance activity. In some cases, a reset of the redundant subsystems 110 may be compulsory after the maintenance activity in order for the changes to take effect. The maintenance activity instruction also may include other parameters, such as a scheduled time for performing the maintenance activity. For example, a scheduled time may be an off-peak time (e.g., Saturday at 2:00 a.m.).

The controller 120 may perform (124) a maintenance activity on the redundant subsystems 110 according to the received maintenance activity instruction. Performing the maintenance activity may also be referred to herein as "maintaining" or to "maintain", for convenience. For example, the maintenance activity may include applying a firmware update for the redundant subsystems 110. In some implementations, the controller 120 may determine whether the maintenance activity is applicable or compatible with individual ones of the redundant subsystems 110, based on such example aspects of the subsystems as a model number, a serial number, a current firmware version, current settings, etc. The controller 120 may perform the maintenance activity on all of the redundant subsystems 110 at once, on a group of the redundant subsystems 110 at a time, or on one subsystem 110 at a time.

After performance of the maintenance activity, the controller 120 may sequentially reset (126) each of the redundant subsystems 110. The controller 120 may wait until a reset is over before initiating the reset of the next subsystem, such that the resets of redundant subsystems 110 do not overlap or happen concurrently.

In some implementations, the controller 120 may wait (128) a random delay between sequential resets of the redundant subsystems 110, or said another way, the controller 120 may wait a random delay before resetting each of the redundant subsystems 110. Each period of random delay may be of a different, random duration. The controller 120 may include a random number generator to determine the value for each random delay. In some implementations, the random delay may be in a range from a predefined minimum to a predefined maximum. The predefined maximum may be a function of an amount of time to return the redundant subsystems 110 to nominal operation after a reset, and may be predefined or preprogrammed into the controller 120 (or included in the maintenance activity instruction) based on manufacturer specifications, user input, or automated machine learning. The predefined minimum may be based on user input or preference or based on an analysis of a useful delay to stagger resets. In some implementations, the random delay may be in a range from zero, as a minimum, to ten seconds, as a maximum.

In some implementations, the controller 120 may perform the maintenance activity on one subsystem at a time, followed by a reset of that subsystem. For example, the controller 120 may maintain subsystem 110-1, wait a random delay, reset subsystem 110-1, maintain subsystem 110-2, wait a random delay, reset subsystem 110-2, maintain subsystem 110-3, wait a random delay, reset subsystem 110-3, and so on.

In other implementations, the controller 120 may perform the maintenance activity on a group of subsystems 110 or on all subsystems 110, and then reset each of those subsystems 110 sequentially. For example, the controller 120 may maintain subsystems 110-1 through 110-3, reset subsystem 110-1, wait a random delay, reset subsystem 110-2, wait a random delay, and reset subsystem 110-3.

In some implementations, the controller 120 may randomize the sequence in which the redundant subsystems 110 are reset, with or without a random delay between resets. To illustrate, in comparison to the above examples, the controller 120 may instead reset the subsystems 110 in an order of subsystem 110-2, subsystem 110-3, and then subsystem 110-1.

In some implementations, the redundant subsystems 110 and the controller 120 may be disposed within a same enclosure. For example, the subsystems 110 and the controller 120 may be disposed within a chassis of a server computer, which may serve as or form part of the system 100. Moreover, the enclosure may one of a plurality of enclosures in an environment, such as a datacenter or server room. Each enclosure of the plurality of enclosures respectively includes a controller analogous to the controller 120 and redundant subsystems analogous to the redundant subsystems 110. Thus, a controller may be associated with the redundant subsystems with which the controller shares an enclosure. In some cases, at least some of the subsystems of the enclosures may be of the same type as subsystems 110.

In some instances, the enclosures may be connected to a common network. More particularly, the controllers of the enclosures may each be baseboard management controllers and the network may be an out-of-band communication path, and a user may issue maintenance activity instructions to each of the baseboard management controllers from a client device (e.g., via a script and/or management software). In a manner analogous to the controller 120 discussed above, the controller of each enclosure may receive the maintenance activity instruction (whether by the network, a physical medium, or another channel or instrument), schedule and perform the maintenance activity on the associated redundant subsystems of that enclosure according to the maintenance activity instruction, and sequentially reset each of the redundant subsystems of the each enclosure after performance of the maintenance activity with a random delay between sequential resets. By virtue of inserting a random delay between sequential resets of subsystems within each enclosure, resets of subsystems across the plurality of enclosures in the datacenter are desynchronized. In other words, resets of subsystems across all of the enclosures are staggered. An example implementation of a plurality of enclosures will be described with respect to FIG. 2.

Figure 2:
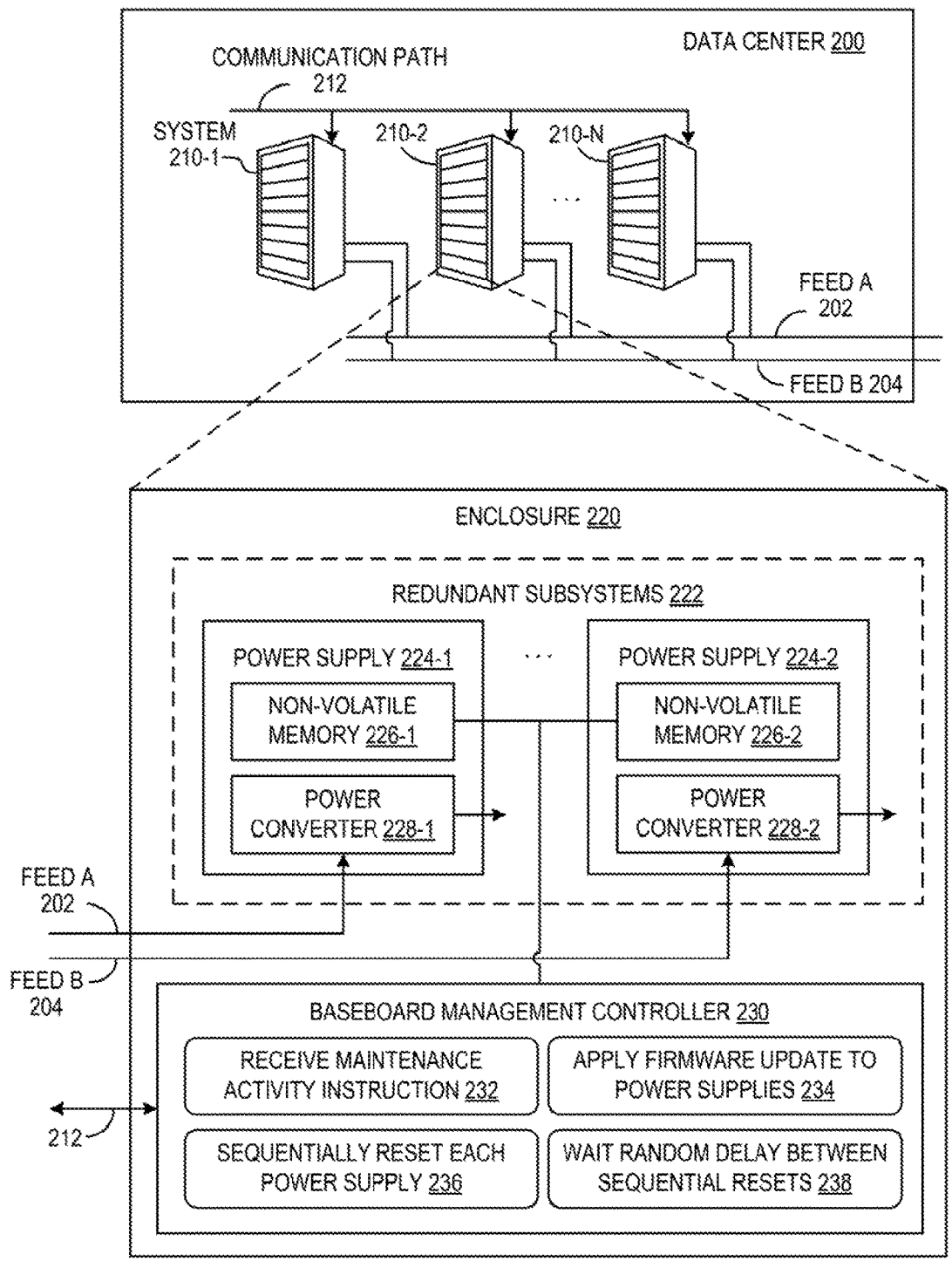
FIG. 2 is a block diagram that depicts an example baseboard management controller that waits random delays between sequential resets of redundant power supplies.

FIG. 2 is a block diagram that depicts an example baseboard management controller that waits random delays between sequential resets of redundant subsystems. In particular, the example of FIG. 2 relates to resetting redundant power supplies after performing a firmware update. In FIG. 2, a datacenter 200 may include a plurality of systems, such as systems 210-1, 210-2, through 210-N (referred to collectively as systems 210 or individually as a system 210). The systems 210 may be, for example, a server computing system, a storage system, etc. The systems 210, as illustrated in particular for system 210-2, may each include at least one enclosure (e.g., 220) that includes redundant subsystems (e.g., 222) and a baseboard management controller (e.g., 230). The baseboard management controller (e.g., 230) of each system 210 may be connected to a communication path 212, which may be an out-of-band communication path.

The redundant subsystems 222 in the illustration of FIG. 2 include power supplies 224-1 and 224-2, although the redundant subsystems 222 may include more power supplies in other examples. The redundant power supplies 224-1 and 224-2 may be part of a larger power redundancy implementation, which includes separate power feeds, feed A 202 and feed B 204. In some implementations, the separate power feeds may arrive from different power generation plants and/or different power grids, for further redundancy. Additionally, within the datacenter 200, feed A 202 and feed B 204 may connect to the systems 210 via separate infrastructure (e.g., circuit breakers, cabling, etc.). Within the enclosure 220, feed A 202 may be coupled to power supply 224-1 while feed B 204 may be coupled separately to power supply 224-2. The alternating current of the feeds may be converted to direct current via power converters 228-1 and 228-2, and the direct current may power various electronic components within the enclosure 220 or system 210-2. Each power supply 224-1 and 224-2 includes non-volatile memory 226-1 and 226-2, respectively, to store firmware that is executed by an on-board controller to govern power supply operation.

The baseboard management controller 230 may be analogous in many respects to the controller 120 described above, and may be a processing resource that executes instructions and/or electronic circuitry. The baseboard management controller 230 may receive (232) a maintenance activity instruction, either via the communication path 212 or a physical medium (e.g., CD, DVD, USB drive, etc.). In particular, the maintenance activity instruction may be an instruction to update the firmware in the non-volatile memory 226-1 and 226-2.

The baseboard management controller 230 applies (234) the firmware update to the power supplies 224-1 and 224-2 by writing the new firmware to the non-volatile memory 226-1 and 226-2. The baseboard management controller 230 sequentially resets (236) each of the power supplies 224-1 and 224-2 after applying the firmware update, and also waits (238) a random delay between sequential resets.

In some implementations, the baseboard management controller 230 may act on each power supply (i.e., apply firmware update and perform a reset) separately and in sequence. In various implementations, the random delay may precede a reset of the power supply or may precede the firmware update of the power supply.

In one illustration, the controller 230 may apply the firmware update to the power supply 224-1, wait a random delay, reset the power supply 224-1, apply the firmware update to the power supply 224-2, wait a random delay, and then reset the power supply 224-2. By virtue of treating each power supply separately, any errors that arise when updating the firmware or resetting the power supply can be corrected or the process may be stopped before acting on the remaining power supply (or supplies).

In some implementations, a user may issue a datacenter-wide maintenance activity instruction to the plurality of computing systems 210 in the datacenter 200. The baseboard management controller of each system 210 may respond in a manner analogous to that described above with respect to the baseboard management controller 230 (e.g., functions 232, 234, 236, 238). Owing to the random delays inserted between resets, synchronization of power supply resets across the datacenter may be reduced or avoided, which may reduce the likelihood of load shifting problems between feed A 202 and feed B 202 and the likelihood of spikes on any one of the feeds.

Figure 3:
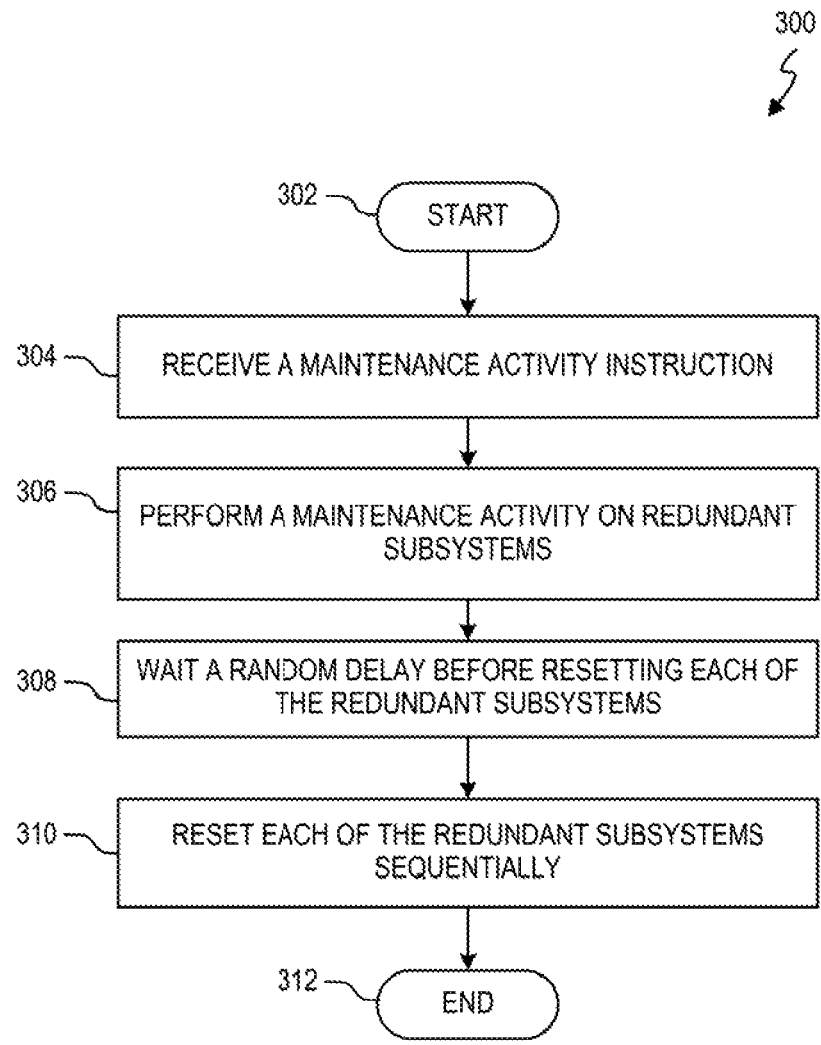
FIG. 3 is a flow diagram depicting an example method for resetting redundant subsystems sequentially.

FIG. 3 is a flow diagram depicting an example method 300 for resetting redundant subsystems sequentially. Method 300 may be implemented in the form of executable instructions stored on a machine readable medium and executed by a processing resource (e.g., a microcontroller, a microprocessor, central processing unit core(s), an ASIC, a FPGA, etc.) and/or in the form of electronic circuitry. For example, method 300 may be performed by the controller 120 of FIG. 1 or the baseboard management controller 230 of FIG. 2. In some implementations, one or more blocks of method 300 may be executed substantially concurrently or in a different order than shown in FIG. 3. In some implementations, method 300 may include more or fewer blocks than are shown in FIG. 3. In some implementations, one or more of the blocks of method 300 may, at certain times, be ongoing and/or may repeat.

Method 300 may begin at block 302, and continue to block 304, where a controller (e.g., 120) receives a maintenance activity instruction. At block 306, the controller (120) performs a maintenance activity on redundant subsystems (e.g., 110) included with a same enclosure as the controller (120), based on the maintenance activity instruction received at block 304. At block 308, the controller (120) waits a random delay before resetting each of the redundant subsystems (120). At block 310, the controller (120) resets each of the redundant subsystems (110) sequentially after performing the maintenance activity on the redundant subsystems (110). Method 300 ends at block 312.

In some implementations, the random delay of block 308 may be in a range from a predefined minimum (e.g., zero seconds) to a predefined maximum (e.g., a time duration based on an amount of time to return a redundant subsystem to nominal operation after a reset by block 310). In some implementations, the random delay may be in a range from zero to ten seconds.

Example types of the redundant systems include redundant power supplies, redundant networking subsystems, redundant thermal management subsystems, and the like. Example maintenance activities performed on the redundant subsystems include a firmware update, changing operational settings, changing firmware settings, maintenance reboots or resets, or other types of maintenance activity. In some implementations, the redundant subsystems are included in computing systems of a datacenter, and the maintenance activity involved in method 300 is rolled out datacenter-wide to the plurality of computing systems.

Figure 4:
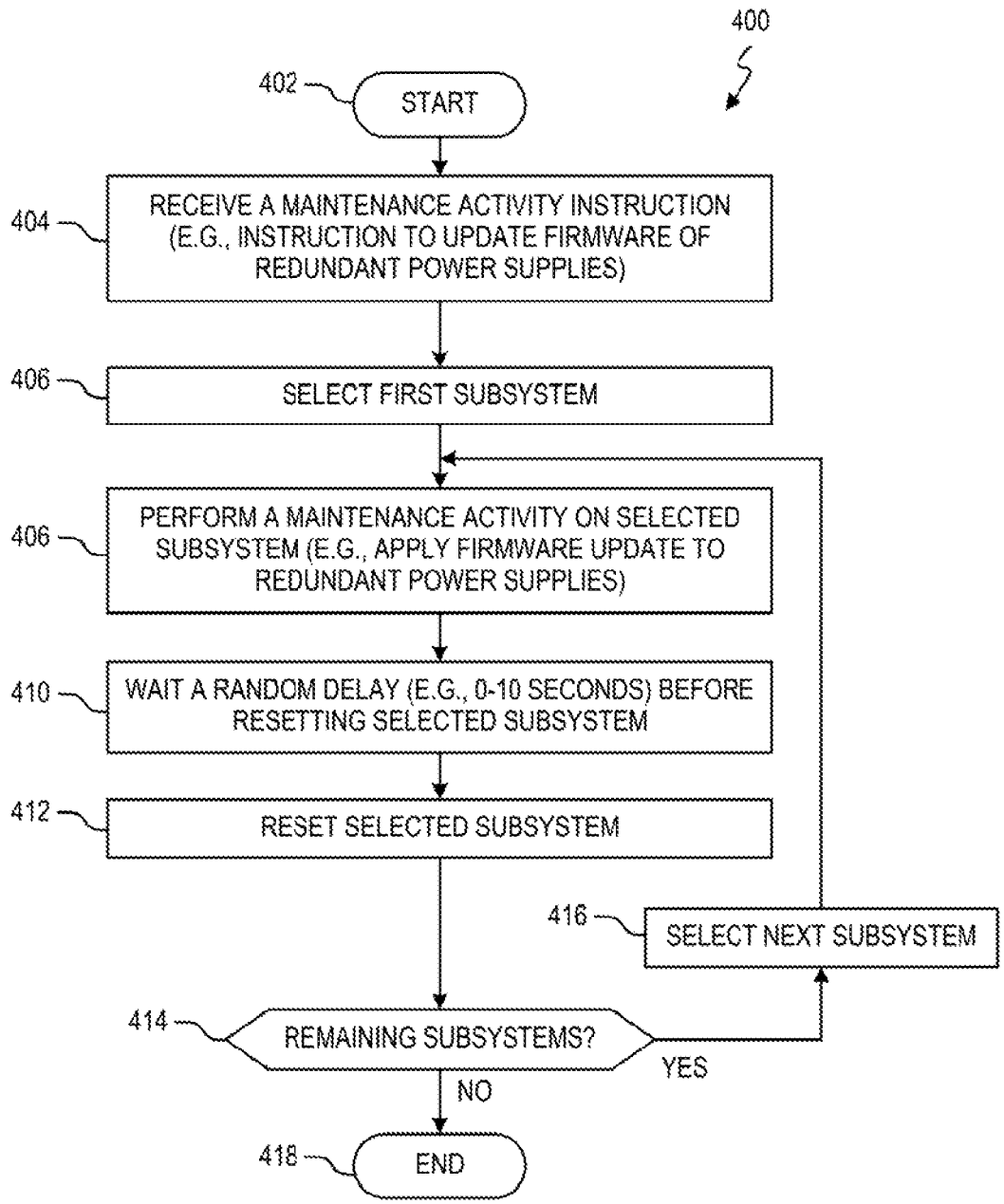
FIG. 4 is a flow diagram depicting another example method for resetting redundant subsystems sequentially.

FIG. 4 is a flow diagram depicting an example method 400 for resetting redundant subsystems sequentially. As with method 300, method 400 may be implemented in the form of executable instructions stored on a machine readable medium and executed by a processing resource and/or in the form of electronic circuitry. Method 400 may be performed by the baseboard management controller 230 of FIG. 2, although method 400 may also be performed by other devices such as the controller 120 of FIG. 1. In some implementations, one or more blocks of method 400 may be executed substantially concurrently or in a different order than shown in FIG. 4, method 400 may include more or fewer blocks than are shown in FIG. 4, and one or more of the blocks of method 400 may be ongoing and/or may repeat.

In particular, method 400 may illustrate the application of method 300 in an environment similar to that described with respect to FIG. 2, that is, in a datacenter (e.g., 200) having a plurality of systems (e.g., 210) that each include at least one redundant subsystem (e.g., 222), and more particularly, redundant power supplies (e.g., 224-1 and 224-2). In that example, a user may issue a maintenance activity instruction to multiple systems or may issue the instruction datacenter-wide.

Method 400 begins at block 402, and continues to block 404, where a controller (e.g., baseboard management controller 230) receives a maintenance activity instruction related to redundant subsystems (222) associated with the controller (230). For example, the instruction may be to update firmware of redundant power supplies (224-1 and 224-2) associated with the controller (230). Block 404 may be performed at each controller of multiple systems (210) within a datacenter (200).

After block 404, the controller (230) may then act on each of the redundant subsystems separately and sequentially, in some implementations. At block 406, the controller (230) selects a first subsystem (e.g., 224-1).

At block 408, the controller (230) may perform a maintenance activity on the selected subsystem. For example, the controller (230) may apply a firmware update by flashing new firmware to a non-volatile memory (e.g., 226-1) of the selected power supply subsystem (224-1).

At block 410, the controller (230) may wait a random delay. The delay may be in a range from a predefined minimum (e.g., zero seconds) to a predefined maximum (e.g., an amount of time it takes for the selected subsystem, or multiple subsystems on average, to return to nominal operation after a reset). For example, the predefined maximum may be approximately ten seconds. After waiting the random delay, the controller (230) may reset the selected subsystem (i.e., power supply 224-1) at block 412.

At block 414, the controller (230) determines whether any remaining subsystems (i.e., power supplies) have not yet been acted on according to the maintenance activity instruction. If there are remaining subsystems ("YES" at block 414), method 400 proceeds to block 416, where a next subsystem (i.e., power supply) is selected, and then proceeds to repeat blocks 406, 410, 412 with that next subsystem. If the maintenance activity has been performed on all of the subsystems ("NO" at block 414), the method proceeds to end at block 418. In some implementations, selecting the subsystems at blocks 406 and 416 may be a randomized process, that is, if there are an N-number of redundant subsystems, the first subsystem is selected at block 406 at random from those N-subsystems, and the next subsystem is selected at block 416 at random from the subsystems that have not yet been acted on per the maintenance activity instructions.

Figure 5:
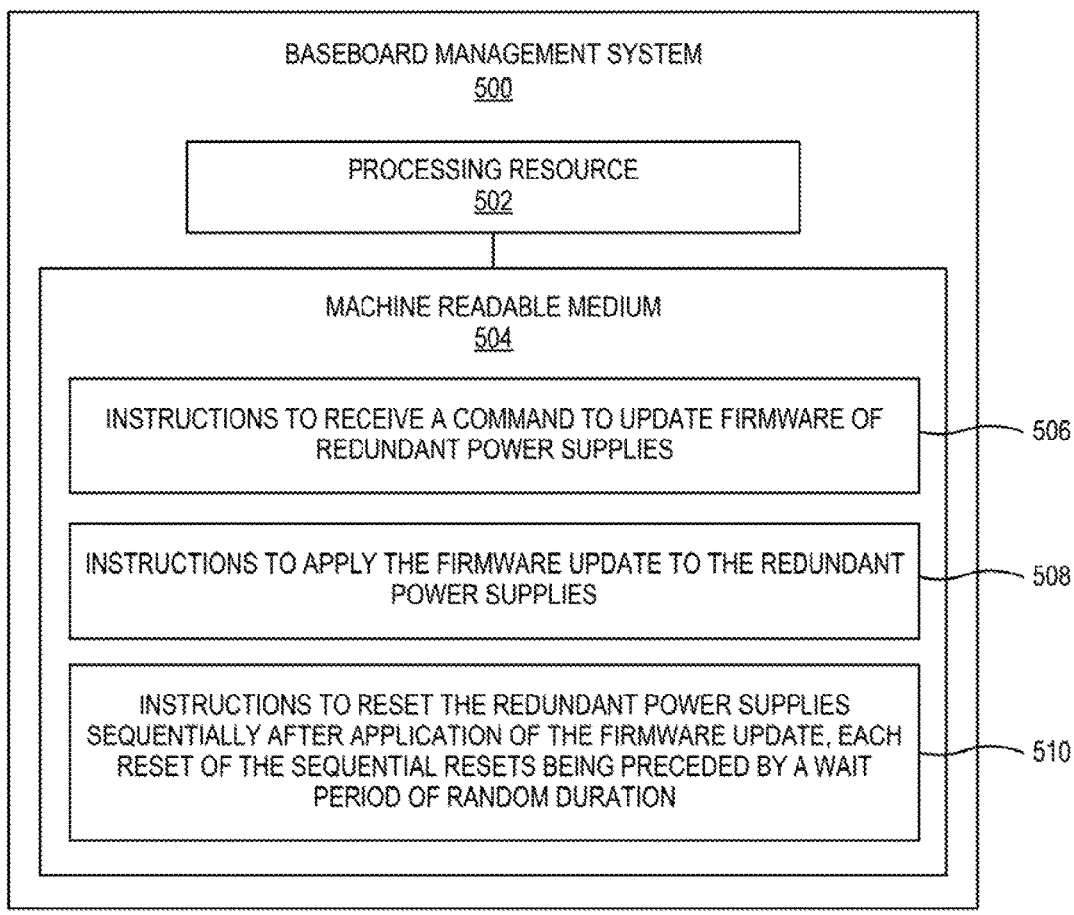
FIG. 5 is a block diagram of an example baseboard management system that includes a non-transitory, machine readable medium encoded with example instructions to reset redundant subsystems sequentially.

FIG. 5 is a block diagram of an example baseboard management system 500 that includes a processing resource 502 coupled to a non-transitory, machine readable medium 504 encoded with example instructions to reset redundant subsystems sequentially. In some implementations, the processing resource 502 and medium 504 together may serve as or form part of a baseboard management controller (e.g., 230) included in the baseboard management system 500. The baseboard management system 500 also may include other components such as networking devices.

The processing resource 502 may include a microcontroller, a microprocessor, central processing unit core(s), an ASIC, an FPGA, and/or other hardware device suitable for retrieval and/or execution of instructions from the machine readable medium 504 to perform functions related to various examples. Additionally or alternatively, the processing resource 502 may include electronic circuitry for performing the functionality of the instructions described herein.

The machine readable medium 504 may be any medium suitable for storing executable instructions, such as RAM, ROM (read only memory), EEPROM, flash memory, a hard disk drive, an optical disc, or the like. In some example implementations, the machine readable medium 504 may be a tangible, non-transitory medium, where the term "non-transitory" does not encompass transitory propagating signals. The machine readable medium 504 may be disposed or integrated within the baseboard management system 500, as shown in FIG. 5, in which case the executable instructions may be deemed "installed" or "embedded" on the baseboard management system 500. Alternatively, the machine readable medium 504 may be a portable (e.g., external) storage medium, and may be part of an "installation package."

As described further herein below, the machine readable medium 804 may be encoded with a set of executable instructions 506, 508, 510. It should be understood that part or all of the executable instructions and/or electronic circuits included within one box may, in alternate implementations, be included in a different box shown in the figures or in a different box not shown. In some implementations, the instructions 506, 508, 510 may be executed to implement method 300 or 400 described above.

Instructions 506, when executed by the processing resource 502, receive a command to update firmware of redundant power supplies. The power supplies may be in communication with the baseboard management system 500, via an I2C bus for example. In some implementations, the power supplies and the baseboard management system 500 may be included in a same enclosure.

Instructions 508, when executed by the processing resource 502, may apply the firmware update to the redundant power supplies. Instructions 510, when executed by the processing resource 502, may reset the redundant power supplies sequentially after application of the firmware update, each reset of the sequential resets being preceded by a wait period of random duration. The random duration may be in a range from zero to ten seconds, or more generally, in a range from zero seconds (or any other predefined minimum) to an amount of time it takes for the power supplies to return to nominal operation after a reset.

In view of the foregoing description, it can be appreciated that waiting a random delay between resets of redundant subsystems and, additionally or alternatively, a randomized subsystem reset order may stagger resets and reduce synchronization of resets, particularly across redundant subsystems included in multiple systems in a datacenter. Reducing synchronization of resets may reduce the likelihood of load shifting problems or load spikes on infrastructure supporting the redundant subsystems.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed:

1. A system comprising: redundant subsystems, wherein the redundant subsystems and a controller are disposed within a same enclosure in a datacenter environment; the controller coupled to the redundant subsystems, the controller to: receive a maintenance activity instruction, perform a maintenance activity on the redundant subsystems according to the maintenance activity instruction, determine a random value for use for a delay of random duration, wherein the delay of random duration is in a range from a predefined minimum to a predefined maximum, wherein the predefined maximum is a function of an amount of time to return the redundant subsystems to nominal operation after a reset, after performance of the maintenance activity, reset each of the redundant subsystems, and wait the delay of random duration between sequential resets of the redundant subsystems.

2. The system of claim 1, wherein the redundant subsystems include redundant power supplies.

3. The system of claim 1, wherein the redundant subsystems include redundant networking subsystems.

4. The system of claim 1, wherein the redundant subsystems include thermal management subsystems.

5. The system of claim 1, wherein the maintenance activity includes applying a firmware update for the redundant subsystems.

6. The system of claim 1, wherein the controller is to randomize the sequence in which the redundant subsystems are reset.

7. The system of claim 1, wherein the redundant subsystems and the controller are disposed within a same enclosure, the enclosure is among a the plurality of enclosures in an a datacenter environment, each enclosure of the plurality of enclosures respectively including a controller and redundant subsystems, the controller of each enclosure to: receive the maintenance activity instruction, perform the maintenance activity on the redundant subsystems of the each enclosure according to the maintenance activity instruction, sequentially reset each of the redundant subsystems of the each enclosure after performance of the maintenance activity, and wait the delay of random duration before the reset of each of the redundant subsystems of the each enclosure to reduce synchronization of resets among the plurality of enclosures.

8. The system of claim 1, wherein the controller is included in a baseboard management controller.

9. The system of claim 1, wherein the predefined maximum is included in the maintenance activity instruction.

10. The system of claim 1, wherein the maintenance activity is associated with multiple delays of random duration for wait periods between sequential resets of the redundant subsystems, and
the controller is to individually determine a random value for each of the multiple delays of random duration.

11. The system of claim 1, wherein the controller is to determine the random value using a random number generator.

12. A method comprising:
receiving, by a controller, a maintenance activity instruction;
performing, by the controller and according to the maintenance activity instruction, a maintenance activity on redundant subsystems included with a same enclosure as the controller;
resetting, by the controller, each of the redundant subsystems sequentially after the performing the maintenance activity on the redundant subsystems; and
waiting, by the controller, a delay of random duration before the resetting of each of the redundant subsystems to reduce synchronization of redundant subsystem resets of a plurality of datacenter systems.

13. The method of claim 12, wherein the delay of random duration is in a range from zero seconds to a predefined maximum, wherein the predefined maximum is a function of an amount of time to return the redundant subsystems to nominal operation after a reset.

14. The method of claim 12, wherein the redundant subsystems include redundant power supplies, and
the maintenance activity includes applying a firmware update to the redundant power supplies.

15. The method of claim 12, wherein
the maintenance activity is rolled out datacenter-wide to the plurality of datacenter systems,
the method further comprising waiting, by controllers of respective ones of the plurality of datacenter systems, the delay of random duration before resetting each redundant subsystem in sequence within respective ones of the plurality of datacenter systems to reduce synchronization of redundant subsystem resets of the plurality of datacenter systems.

16. A non-transitory machine readable medium storing instructions executable by a processing resource included in a baseboard management system, the non-transitory machine readable medium comprising:
instructions to receive a command to update firmware of redundant power supplies;
instructions to apply the firmware update to the redundant power supplies;
instructions to reset the redundant power supplies sequentially after application of the firmware update, each reset of the sequential resets being preceded by a wait period of random duration to reduce synchronization of redundant power supply resets of a plurality of datacenter systems undergoing redundant power supply firmware updates.

17. The non-transitory machine readable medium of claim 16, wherein the random duration is in a range from zero to ten seconds.

18. The non-transitory machine readable medium of claim 16, wherein the delay of random duration is in a range from a predefined minimum to a predefined maximum, wherein the predefined maximum is a function of an amount of time to return the redundant power supplies to nominal operation after a reset.

19. The non-transitory machine readable medium of claim 16, wherein the delay of random duration is up to a predefined maximum included in the command.

* * * * *